(12) United States Patent
Stipanovich et al.

(10) Patent No.: US 12,135,632 B2
(45) Date of Patent: Nov. 5, 2024

(54) CONTROL LOOP FOR SCALING AGENTS IN A CLUSTER

(71) Applicant: GM Cruise Holdings LLC, San Francisco, CA (US)

(72) Inventors: Nicholas Stipanovich, Redmond, WA (US); Stephen James Day, Kirkland, WA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 18/175,991

(22) Filed: Feb. 28, 2023

(65) Prior Publication Data
US 2024/0289251 A1    Aug. 29, 2024

(51) Int. Cl.
| G06F 11/36 | (2006.01) |
| G06F 8/60  | (2018.01) |
| G06F 8/77  | (2018.01) |
| G06F 9/48  | (2006.01) |

(52) U.S. Cl.
CPC .......... *G06F 11/3616* (2013.01); *G06F 8/60* (2013.01); *G06F 8/77* (2013.01); *G06F 9/4881* (2013.01)

(58) Field of Classification Search
CPC .......... G06F 11/3616; G06F 8/60; G06F 8/77
See application file for complete search history.

(56) References Cited

U.S. PATENT DOCUMENTS

| 8,856,797 B1 * | 10/2014 | Siddiqui ............... G06F 9/5061 718/104 |
| 2017/0366412 A1 * | 12/2017 | Piga .................... H04L 67/1008 |
| 2022/0394557 A1 * | 12/2022 | Falla Cepeda ........ H04L 9/3236 |

* cited by examiner

*Primary Examiner* — Nadeem Iqbal

(57) ABSTRACT

A control loop for scaling cloud-based agents in a cluster includes a controller and a feedback signal. The controller may be a proportional-integral controller, or a proportional-integral-derivative controller. The controller may calculate a control variable based on a target number of idle agents for the cluster. The controller receives a target number of idle agents, as well as a current number of idle agents in a cluster. The controller computes the control variable based on the error between the target and current numbers of idle agents, and an integral of the error over time.

14 Claims, 8 Drawing Sheets

CONTROL LOOP FOR SCALING AGENTS IN A CLUSTER

BACKGROUND

1. Technical Field

The present disclosure generally relates to software environments and, more specifically, to control of available agents for performing jobs or tasks in a cloud infrastructure environment.

2. Introduction

Autonomous vehicles, also known as self-driving cars, driverless vehicles, and robotic vehicles, may be vehicles that use multiple sensors to sense the environment and move without human input. Autonomous vehicles are controlled using software systems, which may enable the vehicles to drive on roadways and to accurately and quickly perceive the vehicle's environment, including obstacles, signs, and traffic lights. Autonomous driving software may utilize map data that can include geographical information and semantic objects (such as parking spots, lane boundaries, intersections, crosswalks, stop signs, traffic lights) for facilitating the vehicles in making driving decisions.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
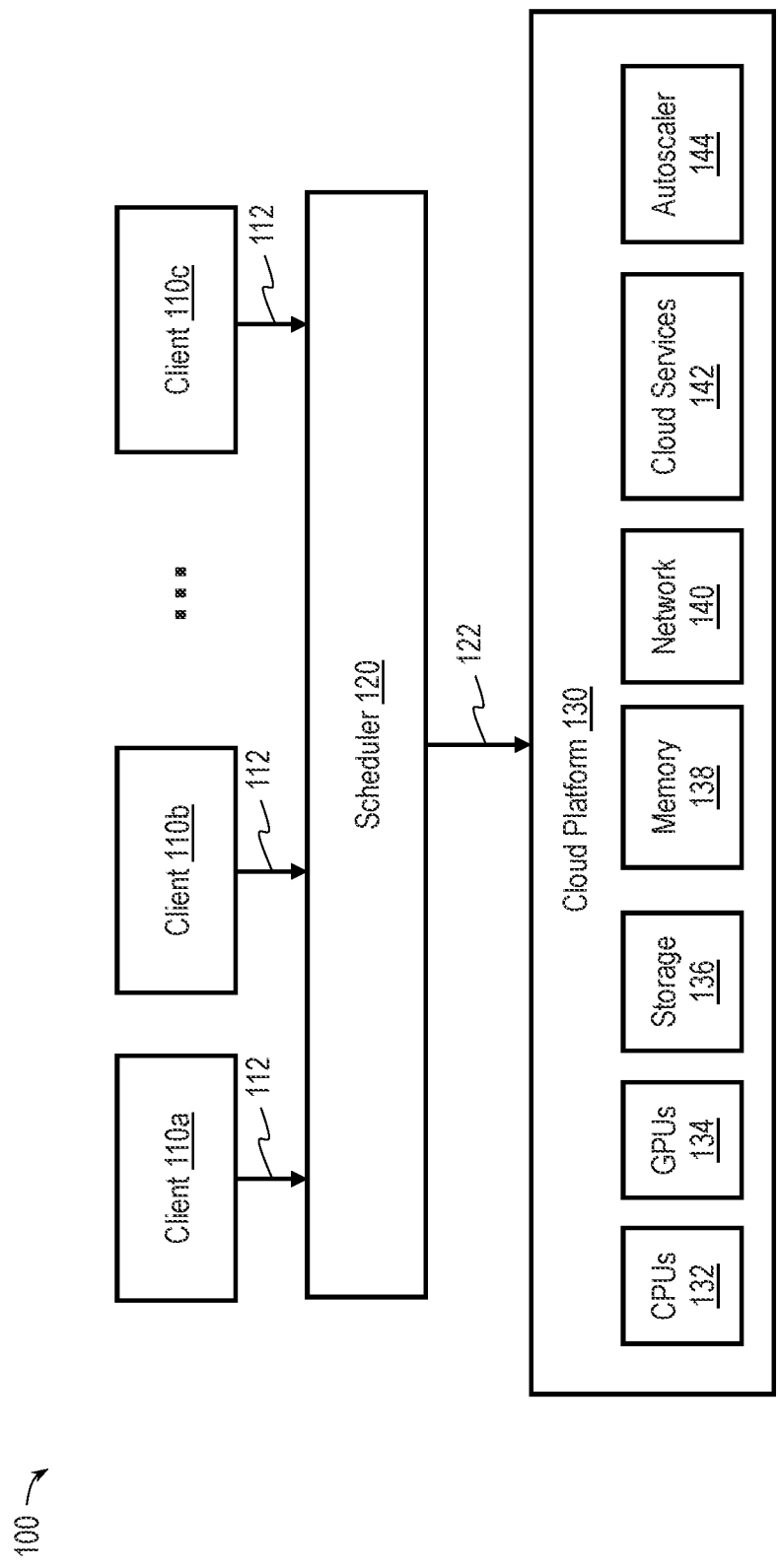
FIG. 1 is a block diagram illustrating an infrastructure framework for autonomous vehicle (AV) software builds and/or AV simulations, according to embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

AVs use a mix of hardware and software to accomplish navigating and driving tasks without a human driver. AVs include computing circuitry in one or more processing units, such as central processing units (CPUs) and/or graphical processing units (GPUs), which run software for processing data and controlling the AV. AVs typically include a variety of sensors to perceive their environment, including RADAR, LIDAR, and cameras. These sensors provide a 360-degree view of the AV's surroundings. The sensor data is provided to computing circuitry (e.g., the CPU or GPU), which runs perception software that processes the sensor data and detects pedestrians, other vehicles, and other objects in the AV's environment. This sensor data and/or additional sensor data, such as a global positioning system (GPS) sensor, accelerometer data, etc., can be used by localization software executing on computing circuitry to determine a precise location of the AV. The AV's computing circuitry may further execute path planning software, which uses the sensor data and AV location to plan a path for the AV to follow. The AV's computing circuitry may also execute control software that generates instructions to control the vehicle's acceleration, braking, and steering based on the planned path, allowing the AV to navigate its environment and avoid any detected obstacles.

The various software components are programmed by software developers in a high-level programming language, such as C, C++, Java, JavaScript, or Python, and then built. In software development, a build is a process of compiling (or converting) software program source codes into an image (e.g., a binary image) that can be executed by a computer-implemented system. The integrated software build may be further tested. For instance, a set of test cases covering various driving scenarios may be defined and the integrated AV software build may be tested against these test cases. After successfully testing the integrated AV software build, the integrated AV software build may be compiled into an AV software release and the AV software release may be further tested (e.g., against the same set of test cases or a different or more extensive set of test cases) before the AV software release is deployed in AVs for real-road testing and real-road driving.

In software engineering, continuous integration (CI) is the practice of merging multiple developers' working copies into a shared repository, also referred to as a mainline. When developers are working on a software project, they each may take a copy of the current source code base from the repository to work on. As different developers make changes to the source code and commit them to the repository, the copy that a given developer is working on may no longer reflect the current source code in the repository. This can lead to integration conflicts when the developer merges new code. To reduce integration conflicts, CI can regularly merge code from multiple developers and perform automated building, testing, and other quality control processes (e.g., static analysis, performance tests, etc.) on the merged code. This merging may happen at a regular cadence, e.g., several times a day. CI may be used with continuous delivery or continuous deployment (CD) in a CI/CD pipeline. "Continuous delivery" ensures the software checked in on the mainline is always in a state that can be deployed to users, while "continuous deployment" fully automates the deployment process.

Cloud-based resources may be used for various software tasks, including building, testing, and deployment involved with CI or CI/CD. In some examples, an infrastructure platform may be built on top of a cloud platform that provides various resources, such as compute resources (e.g., CPU cores and GPU cores), memory resources, storage resources, and/or network resources, for running AV software related tasks (e.g., AV simulations, AV software builds, and model trainings). In an example, the cloud platform may include a shared pool of configurable resources and may present its resources to a cloud user (e.g., the infrastructure platform) in the form of workers or virtual machines (VMs). To that end, a worker may be configured with a specific computational capacity (e.g., 12 CPU cores and 12 GPU core, 12 CPU cores with no GPU core, etc.), a specific storage capacity (e.g., 128 gigabytes (GB) of disk storage, 256 GB of disk storage, etc.), a specific memory capacity (e.g., 16 GB of random-access memory (RAM), 32 GB of RAM, etc.), and/or a specific network capacity (e.g., an uplink bandwidth or throughput and/or a downlink bandwidth or throughput). The cloud platform may be provided by a third-party provider, and each unit of resources or each worker may have an associated cost. Accordingly, it may be desirable to schedule resources in a way that can optimize resource utilization and minimize cost. In particular, it is desirable to ramp up or down resources based on current demand, e.g., to have sufficient resources to meet demand, but not maintain excessive resources during periods of low utilization.

In addition to CI/CD tasks, the cloud platform may be used for other types of tasks.

For example, in an AV software environment, a simulator may simulate (or mimic) real-world conditions (e.g., roads, lanes, buildings, obstacles, other traffic participants, trees, lighting conditions, weather conditions, etc.) so that the AV stack and/or AV compute process of an AV may be tested in a virtual environment that is close to a real physical world. Testing AVs in a simulator can be more efficient and allow for creation of specific traffic scenarios. To that end, the AV compute process implementing the perception, prediction, planning, and control algorithms can be developed, validated, and fine-tuned in a simulation environment. More specifically, the AV compute process may be executed in an AV simulator (simulating various traffic scenarios), and the AV simulator may compute metrics related to AV driving decisions, AV response time, etc. to determine the performance of an AV to be deployed with the AV compute process.

As another example, a cloud infrastructure platform may be used to train machine learning (ML) models that are used to perform perception, prediction, path planning, and/or control for determining a driving decision to navigate an AV. As such, the number of AV simulations, AV software builds, and ML model training that run on the infrastructure platform may reach hundreds of thousands per day. Furthermore, the number of AV simulations, AV software builds, and ML model training sessions may continue to grow as more driving scenarios are identified and/or generated and/or more advanced algorithms are being developed, tested, released, and deployed.

In existing cloud computing environments, an autoscaler is used to dynamically adjust the amount of computational resources dedicated to a particular client or load. The autoscaler can increase or decrease the number of active agents or active machines based on one or more metrics describing a current load in the cloud computing environment, such as processor utilization or memory utilization. As used herein, an agent may be a discrete resource for performing a task. A single VM, also referred to herein as a worker, may include one or more agents. A group of agents that can act together, e.g., to accomplish a set of related tasks or similar tasks, is referred herein to as a cluster.

If a particular workload is large, e.g., larger than the capacity of a single VM, the autoscaler may use different metrics for increasing or decreasing agents. For example, the autoscaler may use, as the load metric, a number of jobs or tasks that are running on the cloud environment, and the autoscaler may use, as a capacity metric, a number of currently idle agents. In some implementations, the autoscaler scales resources in a cluster further based on a target number of idle agents, e.g., by comparing the number of currently idle agents to the target number of idle agents. As used herein, an active agent is an agent that is currently running a task. An idle agent is an agent that is not running a task, but is available for running a task. Having a number of idle agents (e.g., the target number) in the cluster allows the cluster to absorb spikes in demand, e.g., to have agents available to perform additional tasks. In some cases, the autoscaler can take too long to spin up new agents, or can fail to spin up enough agents for a large incoming job.

The present disclosure provides techniques for scaling resources in a cluster that improves on previous scaling methods, e.g., the use of an autoscaler that receives a target number of idle agents, as described above. The resource scaling techniques described herein may be used to facilitate CI tasks, e.g., continuous integration of AV software. In some embodiments, the resource scaling techniques described herein may be used for scaling resources for other applications, such as algorithm development, ML model training, and/or simulation. A control loop may be used to scale resources in a cluster for a particular task or set of tasks. The control loop may sit between a client (e.g., a CI client that accepts code changes from developers) and the infrastructure environment (e.g., a cloud platform that can perform software building, software testing, and other software development tasks). The control loop receives a feedback signal from a cloud environment to provide better control over the scaling of resources in the cluster.

In some embodiments, the control loop may be a proportional-integral (PI) controller. The desired setpoint input to the PI controller may be a target number of idle agents in the cloud platform. A control variable output from the PI controller is provided to the cloud platform or a scheduler for the cloud platform. For example, rather than providing the target number of idle agents to the autoscaler, as described above, the control variable calculated based on the target number of idle agents and a feedback signal be provided to the autoscaler. Providing the control variable from the PI controller to the autoscaler may provide a better response (e.g., faster spinning up of agents to meet demand) than providing the target number of idle agents to the autoscaler.

In some embodiments, a current number of idle agents is fed back into the PI controller, and the PI controller calculates, as an error term, a difference between the current number of idle agents and the target number of idle agents. The PI controller uses this error term to calculate a "proportional term" that is proportional to the error. The PI controller further calculates an "integral term" based on an integral, or sum, of past values of the error term. The PI controller uses the proportional term and integral term to calculate the control variable, e.g., the control variable may be the sum of the proportional term and the integral term.

In some embodiments, a proportional-integral-derivative (PID) controller is used in the control loop. In addition to the proportional term and integral term described above, the PID controller further calculates a derivative term, which is based on a derivative, or slope, of past values of the error term. The PID controller may sum the derivative term with the proportional and integral terms to calculate the control variable.

In some implementations of PID controllers, the integral term integrates over the full history of the control loop, e.g., from a time t=0 to the current time t. This can lead to the integral term becoming too large and, in turn, the control variable becoming too high. In some embodiments, the integral term may be capped, e.g., by not allowing the integral term to exceed a threshold. In some embodiments, the control variable may alternatively be capped, by not allowing the control variable to exceed a threshold. In other embodiments, rather than, or in addition to, capping the integral term or control variable, the error memory may be a moving window that remembers a certain number of past error values, rather than all past error values. In some embodiments, the integral term may be calculated as an exponentially weighted moving average (EWMA) over a rolling window.

The systems, schemes, and mechanisms described herein can advantageously improve task execution efficiencies and/or improve resource utilization by using a control loop to determine a control variable for requesting resources in a cloud computing environment. While the present disclosure may discuss the control loop in the context of continuous integration tasks for AV software builds in some embodiments, similar control loop mechanisms may be applied to other tasks. Further, the term "software build" may generally refer to an AV compute process (e.g., for perception, prediction, planning, and/or control operations) that can be executed on any suitable processors and/or hardware accelerators at a vehicle in operation. In some examples, a software build can also be referred to as a firmware build.

Example Framework for AV Software Builds

FIG. 1 is a block diagram illustrating an infrastructure framework 100 for AV software build(s) and/or AV simulation(s), according to some embodiments of the present disclosure. The infrastructure framework 100 may include a plurality of clients 110 (shown as 110*a*, 110*b*, . . . , 110*c*), a scheduling service layer 120, and a cloud platform 130. The cloud platform 130 may include a shared pool of configurable resources including CPU cores 132, GPU cores 134, storage resources 136 (e.g., disk space), memory 138 (e.g., RAMs), and/or network resources 140 (e.g., an uplink bandwidth, a downlink bandwidth, an uplink throughput, and/or a downlink throughput). The cloud platform 130 may also provide various cloud services 142 (e.g., databases hosting services, monitoring services, reporting services, query services, and/or container registry services, etc.) to assist scheduling and/or resource management. The cloud platform 130 further includes an autoscaler 144 configured to dynamically adjust the amount of computational resources in a cluster, e.g., a cluster dedicated to a particular client 110 or load.

In some aspects, a provider of the cloud platform 130 may host the various resources and/or services at network data centers that are distributed in various geographical locations (e.g., at a west region of United States, an east region of United States, etc.). At a high level, the plurality of clients 110 (or client applications) may request the scheduler 120 to execute certain software jobs (e.g., build jobs), and in response, the scheduler 120 may schedule resources on the cloud platform 130 for execution of the requested jobs. Stated differently, the scheduler 120 may operate as an abstraction layer to hide the underlying cloud platform 130 from the clients 110 so that the cloud platform 130 may be transparent to the clients 110.

The plurality of clients 110 may include AV simulation developers, AV software engineers, AV release and/or quality assurance engineers, etc. The clients 110 may submit job requests 112 to the scheduler 120, for example, via scheduling service application interface (API) calls. Each job may include a collection of one or more tasks associated with an AV software build. For instance, an AV simulation developer may submit a job for an AV simulation, an AV software engineer may submit a job for an AV software build under development or integration, and an AV release and/or quality assurance engineer may submit a job for an AV software build in preparation for a release. An AV software build job may include compilation of various AV software and/or firmware builds, associated testing, and/or generation of software and/or firmware release packages (e.g., to be deployed in AVs similar to the AV 1002 shown in FIG. 7).

In the CI context, the tasks may include merging changes made by the developer to the source codes in the repository, compiling the source codes into an image (e.g., a binary image), and running tests on the compiled code. When CI is used, this integration process may be performed at regular intervals, e.g., at one or more scheduled times each day. In some cases, a developer may merge changes into the code in the repository at other times. In a CI/CD context, after the code has been merged, built, and tested, additional tasks may automatically deploy the updated software to users, e.g., to AVs running the code.

The cloud platform 130 may present its resources (e.g., the CPU cores 132, GPU cores 134, the storage resources 136, and/or memory 138) to the scheduler 120 in the form of workers or worker instances. As an example, a worker may include 12 CPU cores 132, 4 GPU cores 134, 350 GB of storage resources 136 (e.g., disk space), and 64 GB of memory 138. As another example, a worker may include 4 CPU cores 132, 100 GB of storage resources 136, 32 GB of memory 138, and no GPU cores 134. In general, the cloud platform 130 may provision for any suitable number of workers with any suitable configuration or combination of resources.

Upon receiving a job request 112 from a client 110, the scheduler 120 may schedule resources (e.g., workers) on the cloud platform 130 to execute task(s) requested by the job request 112. The scheduler 120 may utilize any suitable scheduling schemes. Some example scheduling schemes may include, but are not limited to, a first-in-first-out (FIFO) scheduling scheme, a completion time-driven scheme, or a gang scheduling scheme. A FIFO scheduling scheme may schedule tasks in the order as they are submitted or requested. A completion time-driven scheme may schedule a task that has an earlier completion deadline over a task that has a later completion deadline and may guarantee that a task will be completed by the requested completion deadline. A gang scheduling scheme may schedule related tasks to run simultaneously on different resources (or processors). The scheduler 120 may transmit a request 122 to the cloud platform 130 to schedule available worker(s) or launch ("spin up") additional worker(s) to execute the tasks, for example, via remote procedure calls (RPCs). The request 122 may be handled by the autoscaler 144, which may spin up workers based on the request 122. In some aspects, to spin up a worker, the scheduler 120 may instruct execution of a VM image on the cloud platform 130, and then download a separate binary task image (e.g., an executable image) to the worker for execution. In general, the scheduler 120 may be responsible for creating VM images (including scheduling within the VM), requesting the cloud platform 130 to launch or spin up certain workers, and assigning jobs (e.g., software build jobs) to the workers.

In the framework 100 shown in FIG. 1, the autoscaler 144 is used to dynamically adjust the amount of computational resources (e.g., VMs) dedicated to a particular client 110. The autoscaler 144 may increase or decrease the number of VMs based on a number of currently active agents or VMs and/or a target number of idle agents or VMs. As described above, in some cases, when the autoscaler 144 responds to the requests 122 from the scheduler 120, the autoscaler 144 can take too long to spin up new agents or VMs, or the autoscaler 144 may fail to spin up enough agents for a large incoming job. A control loop, described in relation to FIGS. 4 and 5, can be used to improve responsiveness of the cloud platform 130 to scale based on workload. While the autoscaler 144 is illustrated as being part of the cloud platform 130, in other embodiments, the autoscaler 144 is in the scheduler 120.

Figure 2:
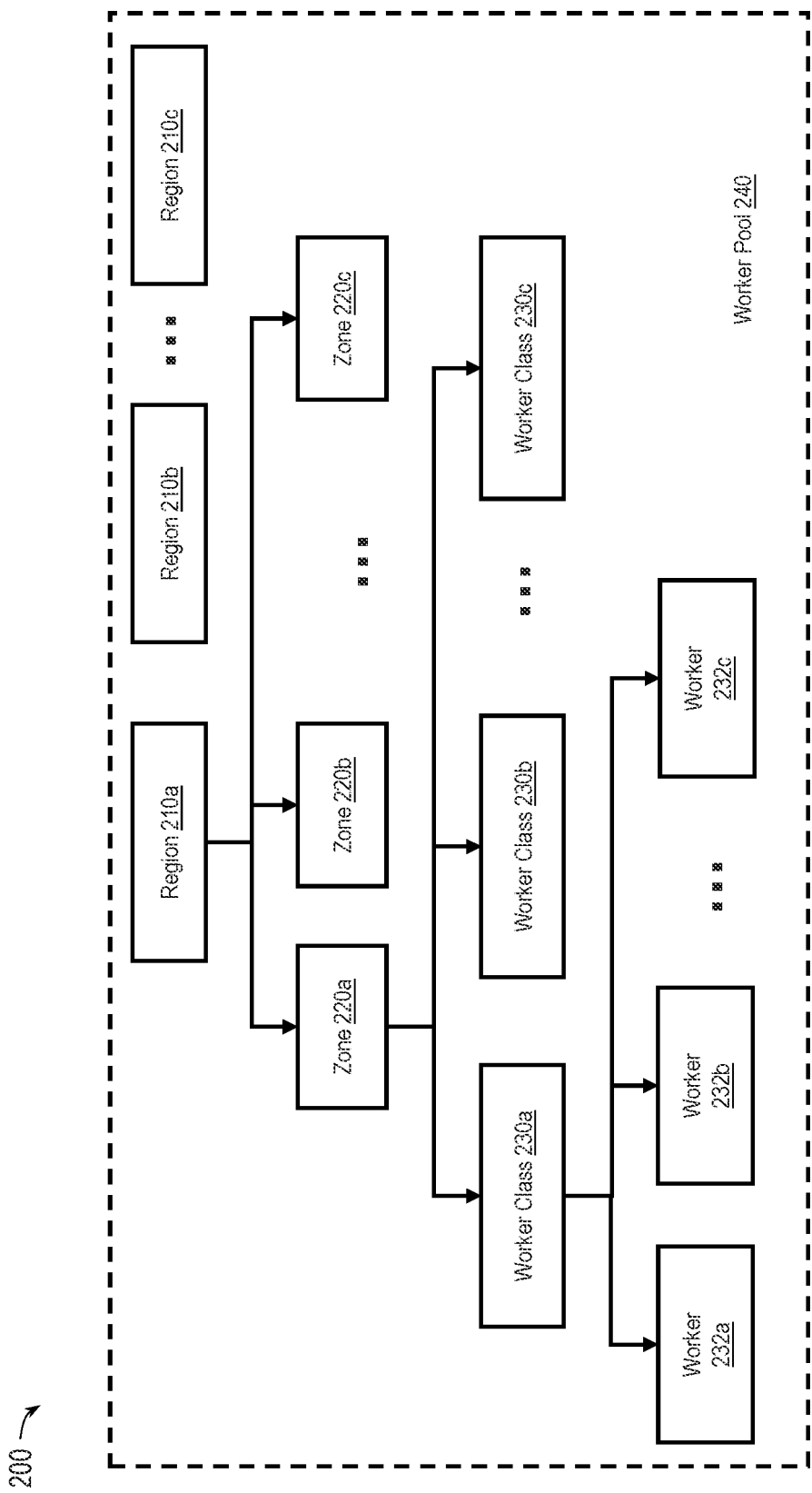
FIG. 2 is a block diagram illustrating an exemplary distributed resource pool configuration for AV software builds and/or AV simulations, according to embodiments of the present disclosure.

FIG. 2 is a block diagram illustrating an exemplary distributed worker pool configuration 200 for AV software builds and/or AV simulations, according to some embodiments of the present disclosure. In an example, the cloud platform 130 of FIG. 1 may include a worker pool similar to the worker pool 240 shown in the FIG. 2 to provide the CPU cores 132, GPU cores 134, the storage resources 136, the memory 138, the network resources 140, etc. for task execution. The worker pool 240 may be a shared pool of configurable resources distributed across multiple geographical locations. As shown, the worker pool 240 may include resources located at a plurality of regions 210 (shown as 210a, 210b, ..., 210c). Some example regions 210 may include a region in Western United States, a region in Eastern United States, etc. Each region 210 may be partitioned into a plurality of zones or areas. In some instances, the different zones may correspond to different network data centers. For simplicity, FIG. 2 only illustrates zones 220 (shown as 220a, 220b, ..., 220c) in the region 210a.

Each zone 220 may provision for various worker classes 230. A worker class 230 may be a template or a configuration of resource capacities. Different worker classes 230 may have different configurations for computational capacities, storage capacities, memory capacities, and/or network capacities. For instance, one worker class 230 may include a configuration for 12 CPU cores (e.g., the CPU cores 132), 4 GPU cores (e.g., the GPU cores 134), 350 GB of disk space (e.g., the storage resources 136), and 64 GB of memory (e.g., the memory 138), and another worker class 230 may include 4 CPU cores, 100 GB of storage resources, 32 GB of memory, and no GPU cores. In general, a zone 220 may provision for any suitable number of worker classes 230 with a configuration for any suitable combination of resources. For simplicity, FIG. 2 only illustrates worker classes 230 (shown as 230a, 230b, ..., 230c) in the zone 220a.

Each worker class 230 may be instantiated into one or more worker instances or workers 232 (e.g., 1, 2, 3, 4, 5, 10, 20, 40, 100 or more). A worker 232 instantiated from a worker class 230 may have the resource capacities (for compute, storage, memory, and/or networking) as specified by the worker class 230. For simplicity, FIG. 2 only illustrates workers 232 (shown as 232a, 232b, ..., 232c) of the worker class 230a.

In some aspects, the worker pool 240 may provision for various types of workers, for example, including non-preemptible workers 232 (or "standard workers") and preemptible workers 232 of any suitable worker classes 230. The non-preemptible workers 232 may include committed workers that are already purchased at a certain cost, for example, by an organization that utilizes the worker pool 240. The non-preemptible workers 232 can also include workers that can be launched (or "spun up") on-demand at a small additional cost. Once a non-preemptible worker 232 is launched, the non-preemptible worker 232 can be used by the infrastructure platform for as long as the infrastructure platform desires. On the other hand, a preemptible worker 232 may be requested (or "spin up") on-demand with a lower cost than the on-demand preemptible workers 232 but can be preempted (or taken away) at some time point of time. As such, while a preemptible worker 232 may have a lower cost, a task scheduled on a preemptible worker may have the risk of not running to completion and having to be rerun on another worker 232.

Figure 3:
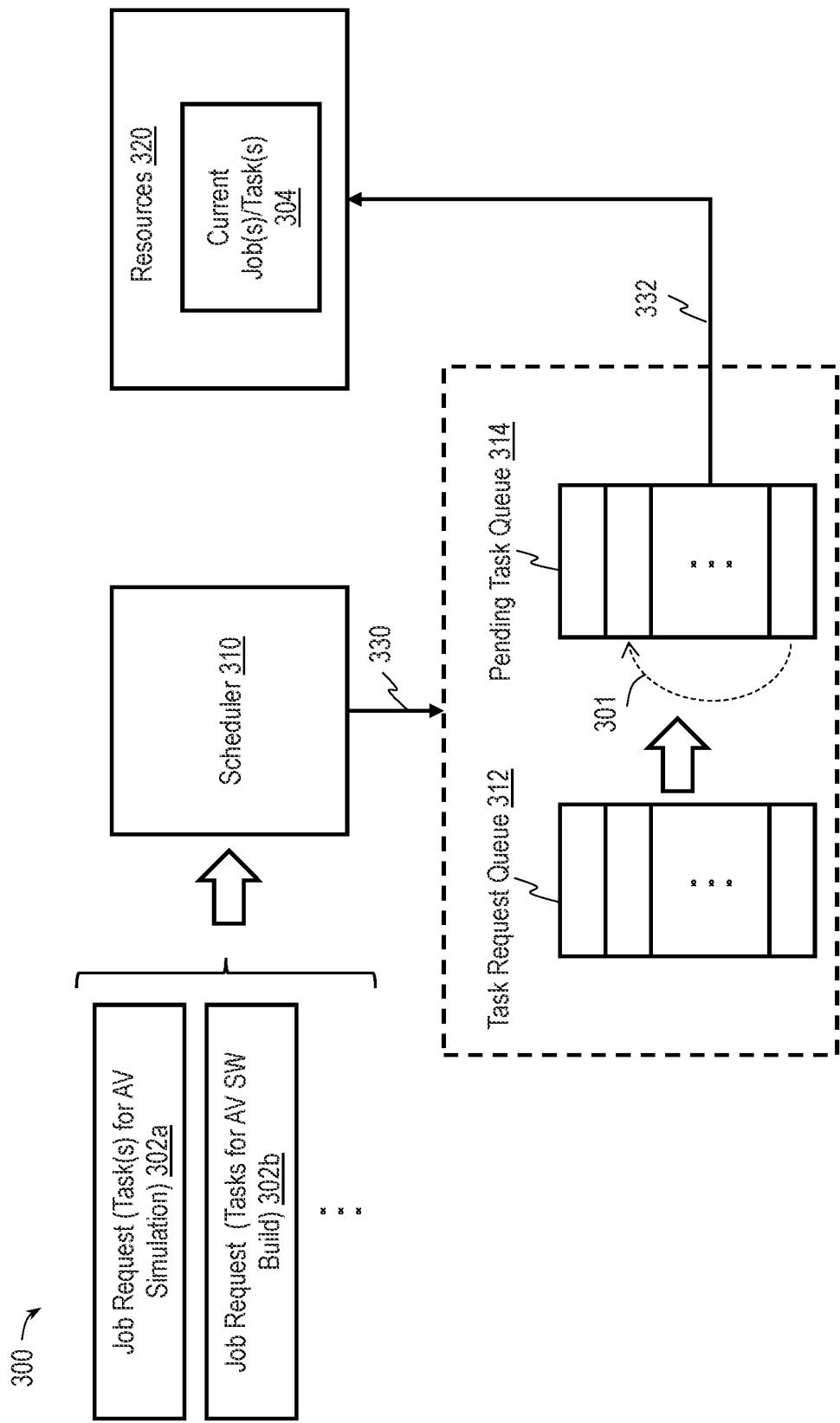
FIG. 3 illustrates an exemplary scheduling scheme for scheduling AV software related tasks in an infrastructure environment, according to some embodiments of the present disclosure.
Figure 4:
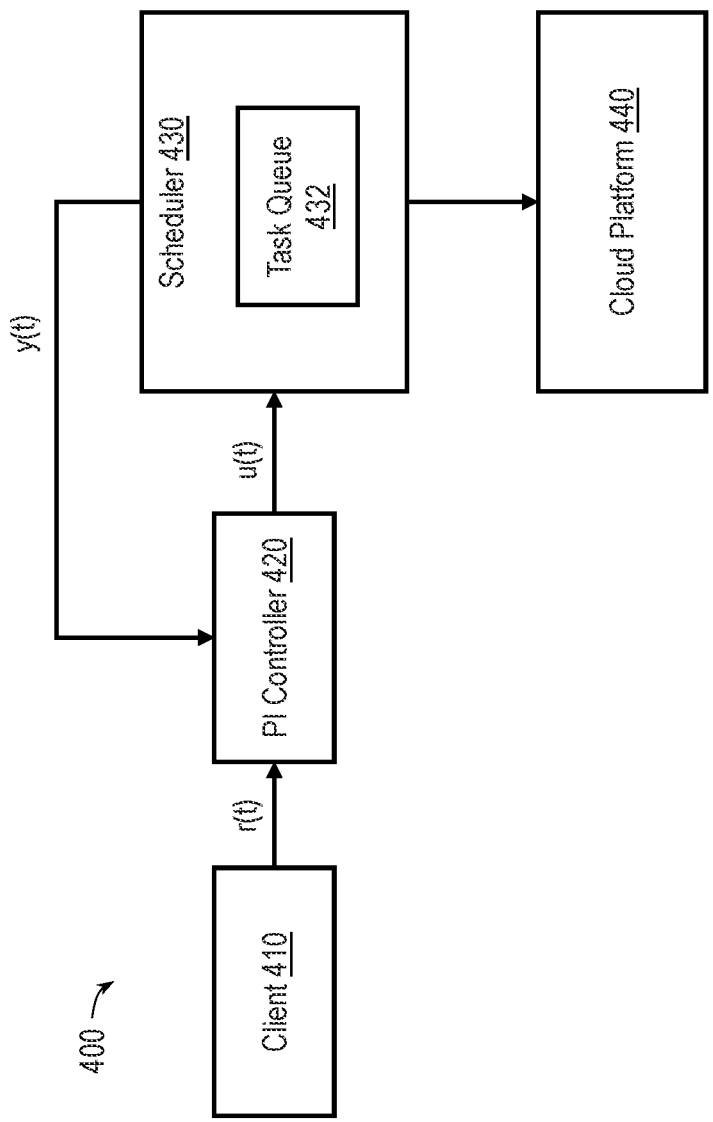
FIG. 4 illustrates an exemplary control scheme for requesting agents to perform AV software related tasks in an infrastructure environment, according to some embodiments of the present disclosure.
Figure 5:
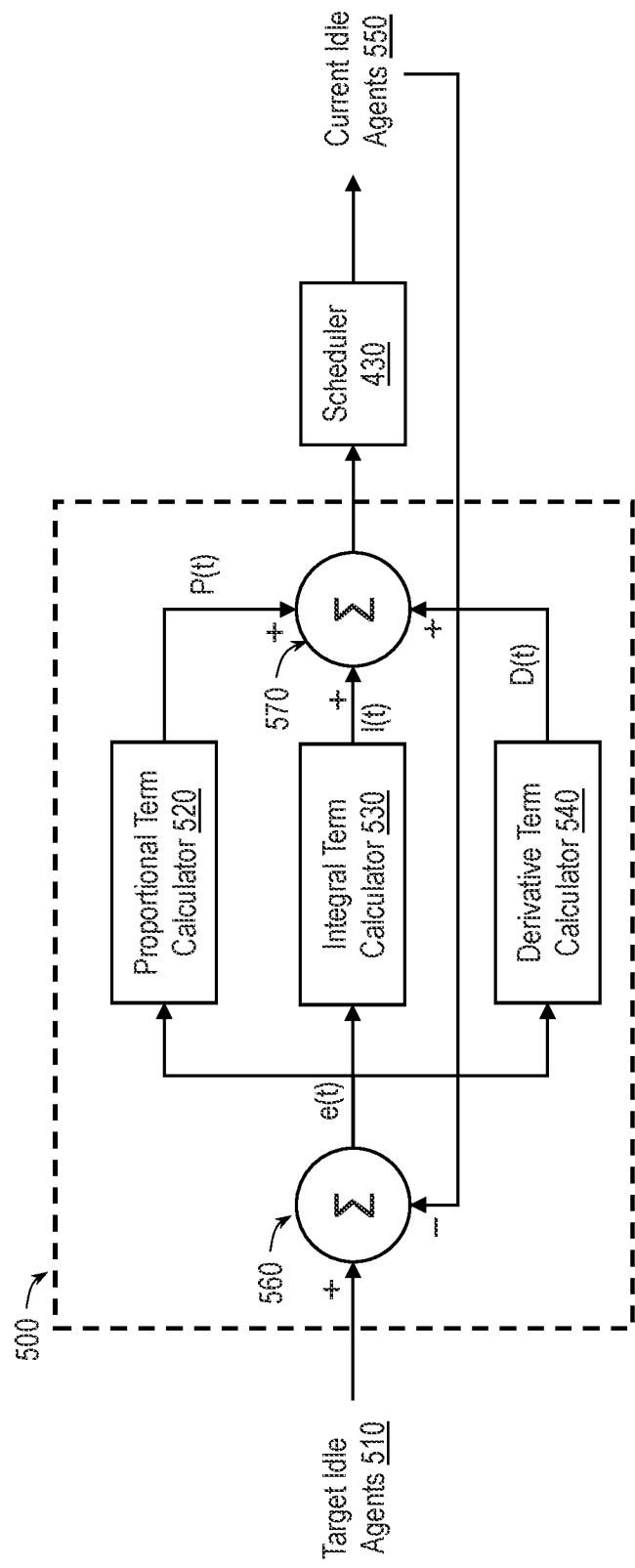
FIG. 5 illustrates an exemplary proportional-integral-derivative controller used in the control scheme shown in FIG. 4, according to some embodiments of the present disclosure.

In general, a scheduler 120 may assign resources for task execution when the resources are available on the cloud platform 130. A control loop may be used by the scheduler 120, or alongside the scheduler 120, to request that computational resources, e.g., workers 232, be spun up or spun down. FIG. 3 illustrates an example scheduling scheme in an infrastructure environment that may facilitate continuous integration related to AV software. FIGS. 4 and 5 illustrate an example control loop that sits between a client (e.g., a client 110) and cloud platform 130 (e.g., the worker pool 200).

FIG. 3 illustrates an exemplary scheduling scheme for scheduling AV software related tasks in an infrastructure environment, according to some embodiments of the present disclosure. In an example, the scheduler 120 of FIG. 1 may perform scheduling as shown in the scheduling scheme 300. As shown in FIG. 3, a scheduler 310 may receive a plurality of job requests 302 (individually shown as 302a and 302b). The job request 302 may be similar to the job request 112. Each job request 302 can include a list of one or more tasks. A task may be related to an AV software build (e.g., for development, integration, and/or release) or an AV simulation (e.g., simulating perception, prediction, planning, and/or control operations of an AV). In the illustrated example of FIG. 3, the job request 302a may include task(s) related to an AV software build (e.g., continuous integration tasks) while the job request 302b may include task(s) related to an AV simulation.

The scheduler 310 may schedule various tasks to be executed using resources 320. The resources 320 may include CPUs, GPUs, storage resources, memory resources, and/or network resources. In some examples, the resources 320 may be on a cloud platform similar to the cloud platform 130 of FIG. 1. In some examples, the resources 320 may be part of a worker pool similar to the worker pool 240 of FIG. 2.

To assist scheduling, the scheduler 310 may include various queues to queue pending jobs ready for execution. The scheduler 310 may generally use any suitable scheduling algorithms and/or any suitable queue structures with any suitable number of queues and corresponding queue sizes. In the illustrated example of FIG. 3, the scheduler 310 may have a task request queue 312 and a pending task queue 314. The task request queue 312 may queue or store jobs (and associated tasks) to be scheduled. The pending task queue 314 may queue or store jobs (and associated tasks) that are scheduled and pending to be executed. In an example, at 330, upon receiving the job request 302a, the scheduler 310 may queue tasks related to the job request 302a at the task request queue 312. Subsequently, the scheduler 310 may retrieve tasks related to the job request 302a from the task request queue 312, analyze the requirements (e.g., task priority, task deadline, estimated runtime, resources, downloading and/or uploading file sizes, etc.) for executing those tasks, and determine a schedule for executing those tasks based on the analysis. A schedule may include a task start time for each task, an order of task executions, resource(s) scheduled for each task execution.

As part of determining the schedule, the scheduler 310 may estimate a runtime for each task (e.g., based on the respective task specification) and assign or schedule resources from the resources 320 to run each task. That is, the scheduler 310 may map each task to certain resources (e.g., worker(s) 232) in the resources 320. To assign resources, the scheduler 310 may determine a suitable worker class (e.g., the worker class 230) for the executing the job, for example, by matching resource requirements for performing the job to resource availabilities of a worker class 230. In an example, when the resources 320 are configured as discussed above with reference to FIG. 2, the scheduler 310 may search for an available worker of the matched worker class. Alternatively, the scheduler 310 may request for (or "spin up") a new worker instantiated from the matched worker class. The instantiation of a worker from a worker class may refer to launching a worker (or creating a VM) using a binary image having a resource configuration as specified by the corresponding worker class.

After determining the schedule for those tasks, the scheduler 310 may queue those tasks at the pending task queue 314 (e.g., in the order of execution). In some examples, the scheduler 310 may sort or reorder the pending task queue 314 as shown by the dotted arrow 301. Subsequently, at 332, the tasks from the pending task queue 314 may be loaded onto the resources 320 for execution according to the schedule and/or resource assignment determined by the scheduler 310. The job(s) and/or tasks(s) that are being executed by the resources 320 are shown by 304. In some examples, the scheduler 310 can utilize an additional queue to track job(s) and/or task(s) that are under execution.

The number of AV software builds and/or AV simulations executed on an infrastructure platform may reach hundreds of thousands per day. Furthermore, the demand for build and/or simulation tasks varies considerably over time. For example, for continuous integration, a full software build may happen one or more times per day; during each of these full builds, a large amount of computing resources are used, but after the CI process is complete, some agents may be spun down. Accordingly, it may be desirable to be able to more effectively scale up computational resources (e.g., spin up agents) during periods of high activity, e.g., during a CI build. FIGS. 4 and 5 illustrate a control loop mechanism for scaling resources in a cluster that improves on previous scaling methods, e.g., to increase task execution efficiencies and/or improve resource utilization.

Example Control Scheme for Requesting Agents

FIG. 4 illustrates an exemplary control scheme for requesting agents to perform AV software related tasks in an infrastructure environment, according to some embodiments of the present disclosure. FIG. 4 includes a client 410, e.g., one of the clients 110a-110c from FIG. 1. The client 410 may be a continuous integration system, or CI system. FIG. 4 further includes the scheduler 430, which may be the scheduler 120 shown in FIG. 1 or the scheduler 310 shown in FIG. 3. The scheduler 430 maintains one or more task queues 432, e.g., the task request queue 312 and/or a pending task queue 314. The scheduler 430 submits tasks to the cloud platform 440, e.g., the cloud platform 130, which has one or more clusters of agents to perform the submitted tasks. For example, the agents may be part of the worker pool 240 or the resources 320.

The scheme 400 further includes a proportional-integral (PI) controller 420, which is arranged in a feedback loop with the scheduler 430. The PI controller 420 receives a setpoint value r(t) from the client 410. The setpoint value r(t) may be the target number of idle agents for the client 410. While the target number of idle agents is indicated to be a time-varying variable, in some embodiments, the target number of idle agents is a constant. In some cases, the target number of idle agents may vary according to a schedule, e.g., a greater number of idle agents during business hours (e.g., 8 am to 6 pm) and a few number overnight (e.g., 6 pm through 8 am), or a greater number of idle agents during scheduled integrations or builds. In some embodiments, the target number of idle agents is stored in the PI controller 420, rather than being received from the client 410. In some embodiments, the PI controller 420 may learn a schedule or curve for the target number of idle agents by observing workloads over time.

The PI controller 420 outputs a control variable u(t) to the scheduler 430. The control variable u(t) may be understood to the scheduler 430 as being a target number of idle agents. The control variable may be provided to the cloud platform 440, e.g., to the autoscaler 144, which scales resources (e.g., spins up or spins down agents) based on the control variable. At a given time t, the control variable u(t) may have a different value from the target number of idle agents r (t), and the control variable u(t) may be tuned to provide a more effective response in scaling the cluster on the cloud platform 440 up or down than the target number of idle agents r(t). In other words, the PI controller 420 applies a correction to the target number of idle agents r(t) to generate the control variable u(t).

The correction applied by the PI controller 420 is based on feedback from the scheduler 430. The scheduler 430 outputs a process value y(t), which may be an actual current number of idle agents in the cluster. The PI controller 420 may calculate an error between the control variable r(t) and the process value y(t), i.e., the difference between the target number of idle agents and the current number of idle agents in the cluster. The PI controller 420 may further compute an integral of previous error terms, and the PI controller 420 computes the control variable u(t) based on the error term and the integral term. In some embodiments, the PI controller 420 is a proportional-integral-derivative (PID) controller; in such embodiments, the PI controller 420 may further compute a derivative term based on two or more previous error values, and use the derivative term to calculate the control variable u(t). The details of a PI controller and PID controller are described further in relation to FIG. 5.

While the PI controller 420 is illustrated as being between the client 410 and the scheduler 430, in some embodiments, the PI controller 420 is a sub-component (e.g., a software module) of the scheduler 430, or a sub-component (e.g., a software module) of the cloud platform 440.

Example PID Controller

FIG. 5 illustrates an exemplary proportional-integral-derivative (PID) controller 500 used in the control scheme shown in FIG. 4, according to some embodiments of the present disclosure. The PID controller 500 is an example of the PI controller 420 shown in FIG. 4. The PID controller 500 receives a target number of idle agents 510, which may be referred to as r (t) or a setpoint value, as noted with respect to FIG. 4. The PID controller 500 also receives a current number of idle agents 550, which may be referred to as y(t) or a process value, as noted with respect to FIG. 4. The current number of idle agents 550 and target number of idle agents 510 are input to an adder 560 which adds the target number of idle agents 510 and the negation of the current number of idle agents 550; in other words, the adder 560 subtracts the current number of idle agents 550 from the target number of idle agents 510. The adder 560 outputs an error, referred to as e(t). In other embodiments, the adder 560 may be implemented as a subtractor, which subtracts the target number of idle agents 510 from the current number of idle agents 550.

The error term e(t) is provided to three calculators 520, 530, and 540. The proportional term calculator 520 calculates a proportional term, referred to as P or P(t). The proportional term P(t) is proportional to the error e(t), i.e., the proportional term P(t) is proportional to the difference between the target number of idle agents and the current number of idle agents. For example, the proportional term calculator 520 may multiply the error e(t) at the current time by a scaling factor to calculate the proportional term P(t).

The integral term calculator 530 calculates an integral term, referred to as I or I(t). The integral term is proportional to an integral of the error e(t) over a period of time. For example, because the error e(t) is a set of discrete values (i.e., values at different points in time over a period of time), the integral term I(t) may be proportional to a sum of past values of the error term e(t). The integral term calculator 530 may multiply the sum of the past error values by a second scaling factor, which may be referred to as an integral scaling factor, to calculate the integral term I(t).

The derivative term calculator 540 calculates a derivative term, referred to as D or D(t). The derivative term is proportional to a change in the error e(t), e.g., a change between a last error value and a current error value. At time t, the derivative term is proportional to e(t)−e(t−1). The derivative term calculator 540 may calculate the change in the error e(t) and then multiply this by a third scaling factor, which may be referred to as a derivative scaling factor, to calculate the derivative term D(t). As noted with respect to FIG. 4, in some embodiments, the control loop may use a PI controller rather than a PID controller; in such embodiments, the derivative calculator 540 is omitted.

The proportional term calculator 520, integral term calculator 530, and derivative term calculator 540 (if included) each provide an output (P(t), I(t), and D(t), respectively) to a second adder 570, which sums the outputs. The sum of P(t), I(t), and D(t) is the control variable u(t), which is input to the scheduler 430, as described with respect to FIG. 4.

In a first embodiment, the integral term integrates over all past values of the error. In some cases, the integral term may become too large. For example, if the scheduler 430 is slow to spin up agents (e.g., due to resource constraints in the cloud platform 440), a large error may persist for a period of time.

Several techniques may be used to prevent the integral term from continuing to grow. In one example, the integral term may have a maximum value, over which the maximum value is used (rather than continuing to grow the error term). In this example, at a given time, the integral term may be compared to a threshold value; if the integral term is greater than the threshold value, the threshold value is used as the integral term when computing the control variable. As another example, rather than the integral term having a maximum value, the control variable (equal to the sum of the integral term and the proportional term, or the sum of the integral term, proportional term, and derivative term) may have a maximum value. In this embodiment, at a given time, the control variable may be compared to a threshold value; if the control variable is greater than the threshold value, the threshold value is used as the control variable.

In still another example, rather than calculating the integral term over all past values of the error, the integral term is calculated based on a moving window (also referred to as a rolling window) of error values, e.g., the 10 most recent error values, or the 40 most recent error values. The error values may be stored in an array; at each time t, the oldest error value is discarded, and the newest error value is added to the array. The array may be ordered, such that at each time t, the error values move one position, with the oldest being discarded, and the newest being added to an end position of the array. The integral term may be calculated using the error values in the array. In some embodiments, different weights are applied to different values in the array when calculating the error term, e.g., more heavily weighting more recent error terms. For example, an exponentially weighted moving average (EWMA) may be used to calculate the integral term.

Example Scaling Control Process

Figure 6:
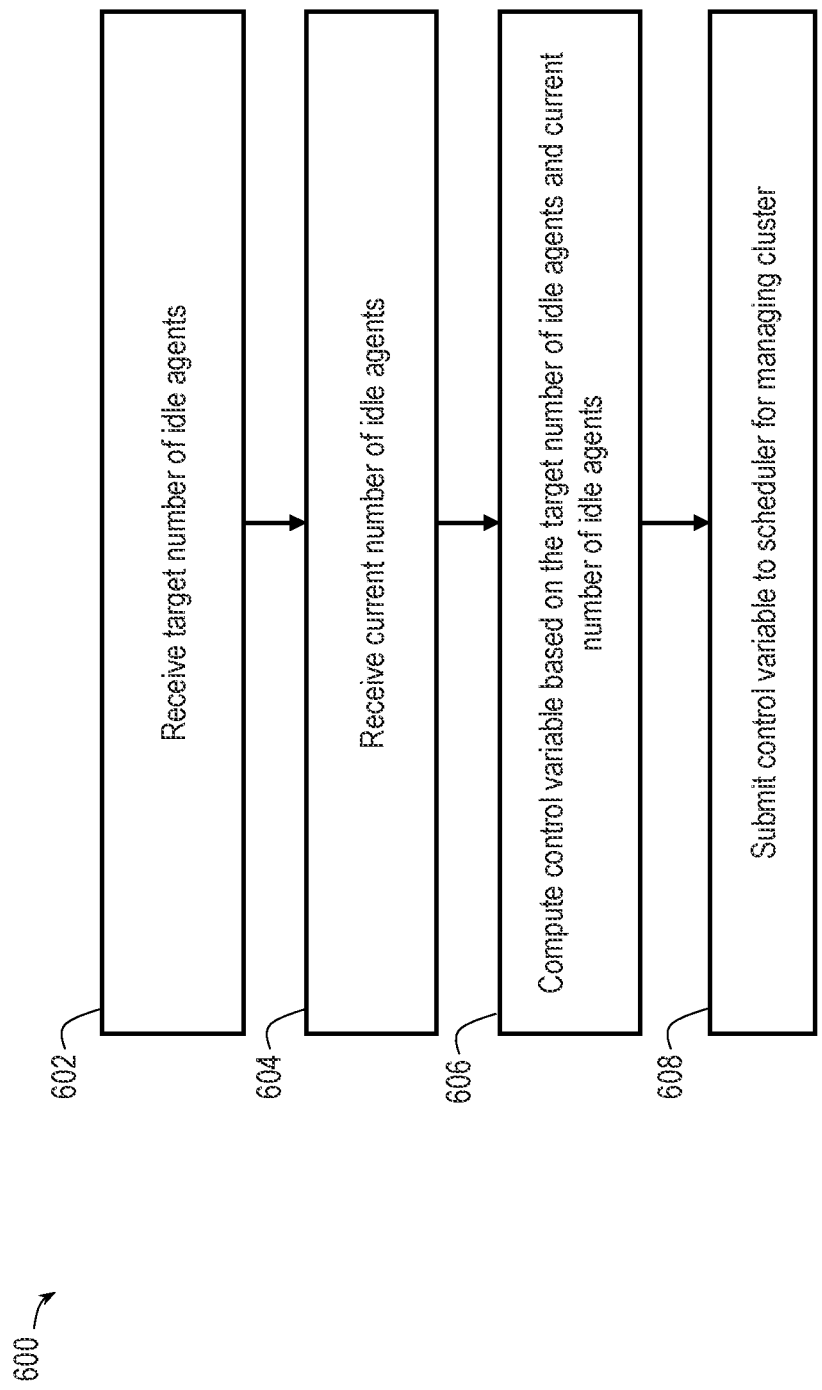
FIG. 6 is a flow diagram illustrating an exemplary control process for scaling software agents for AV software related tasks in an infrastructure environment, according to some embodiments of the present disclosure.

FIG. 6 is a flow diagram illustrating an exemplary control process 600 for scaling software agents for AV software related tasks in an infrastructure environment. The process 600 can be implemented by a computer-implemented system using any suitable hardware components and/or software components. The process 600 may utilize similar mechanisms discussed above with reference to FIGS. 1-5. Operations are illustrated once each and in a particular order in FIG. 6, but the operations may be performed in parallel, reordered, and/or repeated as desired.

A controller in a feedback loop, such as the PI controller 420 or PID controller 500, receives 602 a target number of idle agents. For example, the target number of idle agents may be received from a client 110. As described above, an idle agent refers to a computing resource in a cluster of cloud-based computing resources, and in particular, to an agent in the cluster that is not performing a task.

The controller (e.g., the PI controller 420 or PID controller 500) also receives 604 a current number of idle agents. The current number of idle agents may be provided as feedback to the controller. The current number of idle agents may be provided by a schedule or a cloud platform, as described with respect to FIGS. 4 and 5.

The controller (e.g., the PI controller 420 or PID controller 500) computes 606 a control variable for the cluster of cloud-based computing resources based on the target number of idle agents and the current number of idle agents. As described with respect to FIGS. 4 and 5, the controller may first compute an error, or difference, between the target number of idle agents and the current number of idle agents, and then compute the control variable based the error.

The controller (e.g., the PI controller 420 or PID controller 500) submits 608 the control variable to a scheduler for managing the cluster. For example, the controller submits the control variable to the scheduler 430, which may spin up or spin down agents or VMs based on the control variable.

Example AV Management System

Figure 7:
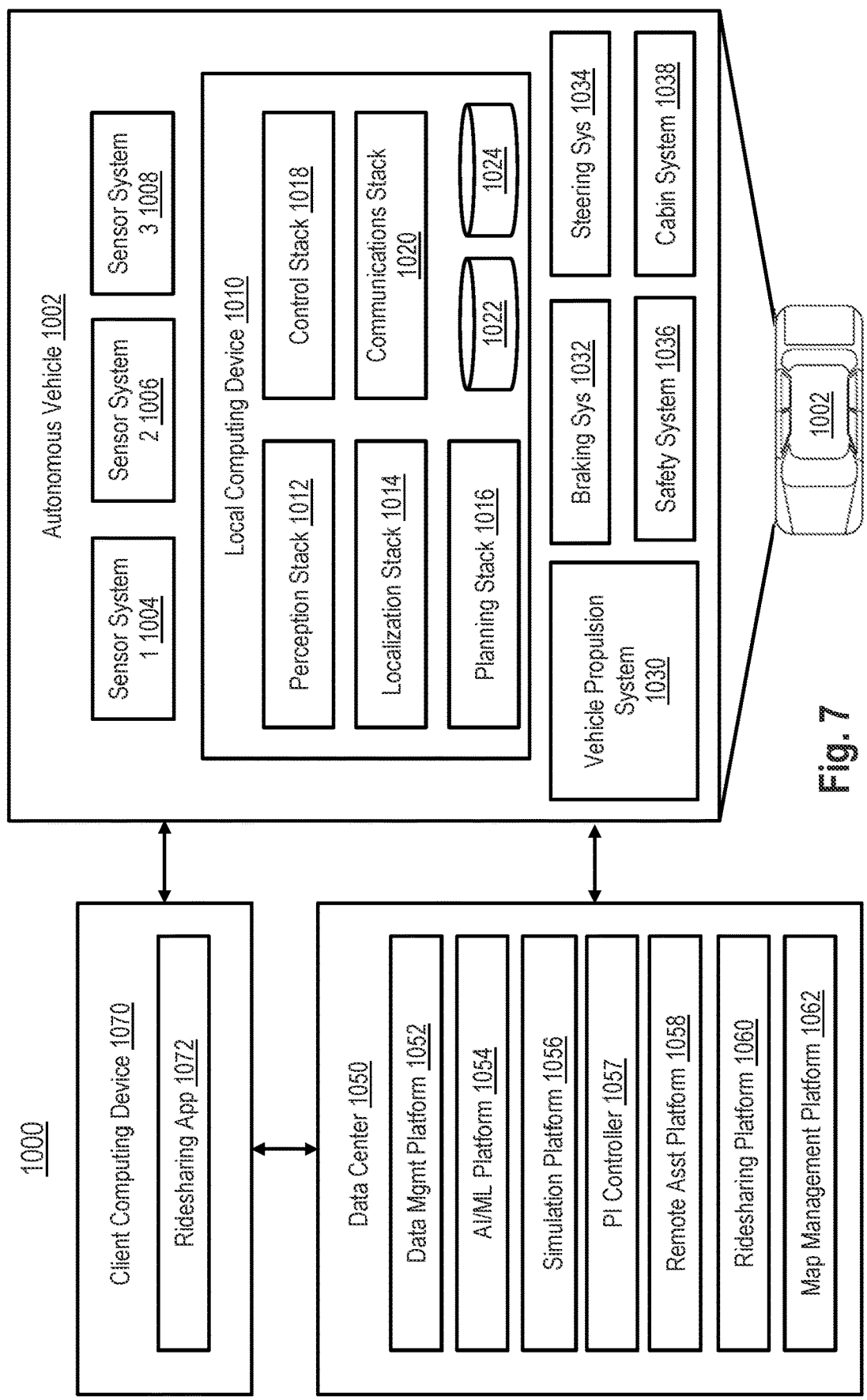
FIG. 7 illustrates an example system environment that may be used to facilitate AV dispatch and operations, according to some aspects of the disclosed technology.

Turning now to FIG. 7, this figure illustrates an example of an AV management system 1000. One of ordinary skill in the art will understand that, for the AV management system 1000 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 1000 includes an AV 1002, a data center 1050, and a client computing device 1070. The AV 1002, the data center 1050, and the client computing device 1070 may communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 1002 may navigate about roadways without a human driver based on sensor signals generated by multiple sensor systems 1004, 1006, and 1008. The sensor systems 1004-1008 may include different types of sensors and may be arranged about the AV 1002. For instance, the sensor systems 1004-1008 may comprise IMUs, cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 1004 may be a camera system, the sensor system 1006 may be a LIDAR system, and the sensor system 1008 may be a RADAR system. Other embodiments may include any other number and type of sensors.

AV 1002 may also include several mechanical systems that may be used to maneuver or operate AV 1002. For instance, the mechanical systems may include vehicle propulsion system 1030, braking system 1032, steering system 1034, safety system 1036, and cabin system 1038, among other systems. Vehicle propulsion system 1030 may include an electric motor, an internal combustion engine, or both. The braking system 1032 may include an engine brake, a wheel braking system (e.g., a disc braking system that utilizes brake pads), hydraulics, actuators, and/or any other suitable componentry configured to assist in decelerating AV 1002. The steering system 1034 may include suitable componentry configured to control the direction of movement of the AV 1002 during navigation. Safety system 1036 may include lights and signal indicators, a parking brake, airbags, and so forth. The cabin system 1038 may include cabin temperature control systems, in-cabin entertainment systems, and so forth. In some embodiments, the AV 1002 may not include human driver actuators (e.g., steering wheel, handbrake, foot brake pedal, foot accelerator pedal, turn signal lever, window wipers, etc.) for controlling the AV 1002. Instead, the cabin system 1038 may include one or more client interfaces (e.g., Graphical User Interfaces (GUIs), Voice User Interfaces (VUIs), etc.) for controlling certain aspects of the mechanical systems 1030-1038.

AV 1002 may additionally include a local computing device 1010 that is in communication with the sensor systems 1004-1008, the mechanical systems 1030-1038, the data center 1050, and the client computing device 1070, among other systems. The local computing device 1010 may include one or more processors and memory, including instructions that may be executed by the one or more processors. The instructions may make up one or more software stacks or components responsible for controlling the AV 1002; communicating with the data center 1050, the client computing device 1070, and other systems; receiving inputs from riders, passengers, and other entities within the AV's environment; logging metrics collected by the sensor systems 1004-1008; and so forth. In this example, the local computing device 1010 includes a perception stack 1012, a mapping and localization stack 1014, a planning stack 1016, a control stack 1018, a communications stack 1020, a High Definition (HD) geospatial database 1022, and an AV operational database 1024, among other stacks and systems.

Perception stack 1012 may enable the AV 1002 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 1004-1008, the mapping and localization stack 1014, the HD geospatial database 1022, other components of the AV, and other data sources (e.g., the data center 1050, the client computing device 1070, third-party data sources, etc.). The perception stack 1012 may detect and classify objects and determine their current and predicted locations, speeds, directions, and the like. In addition, the perception stack 1012 may determine the free space around the AV 1002 (e.g., to maintain a safe distance from other objects, change lanes, park the AV, etc.). The perception stack 1012 may also identify environmental uncertainties, such as where to look for moving objects, flag areas that may be obscured or blocked from view, and so forth.

Mapping and localization stack 1014 may determine the AV's position and orientation (pose) using different methods from multiple systems (e.g., GPS, IMUs, cameras, LIDAR, RADAR, ultrasonic sensors, the HD geospatial database 1022, etc.). For example, in some embodiments, the AV 1002 may compare sensor data captured in real-time by the sensor systems 1004-1008 to data in the HD geospatial database 1022 to determine its precise (e.g., accurate to the order of a few centimeters or less) position and orientation. The AV 1002 may focus its search based on sensor data from one or more first sensor systems (e.g., GPS) by matching sensor data from one or more second sensor systems (e.g., LIDAR). If the mapping and localization information from one system is unavailable, the AV 1002 may use mapping and localization information from a redundant system and/or from remote data sources.

The planning stack 1016 may determine how to maneuver or operate the AV 1002 safely and efficiently in its environment. For example, the planning stack 1016 may receive the location, speed, and direction of the AV 1002, geospatial data, data regarding objects sharing the road with the AV 1002 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 1002 from one point to another. The planning stack 1016 may determine multiple sets of one or more mechanical operations that the AV 1002 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 1016 may select from multiple backup plans to carry out. For example, while preparing to change lanes to turn right at an intersection, another vehicle may aggressively cut into the destination lane, making the lane change unsafe. The planning stack 1016 could have already determined an alternative plan for such an event, and upon its occurrence, help to direct the AV 1002 to go around the block instead of blocking a current lane while waiting for an opening to change lanes.

The control stack 1018 may manage the operation of the vehicle propulsion system 1030, the braking system 1032, the steering system 1034, the safety system 1036, and the cabin system 1038. The control stack 1018 may receive sensor signals from the sensor systems 1004-1008 as well as communicate with other stacks or components of the local computing device 1010 or a remote system (e.g., the data center 1050) to effectuate operation of the AV 1002. For example, the control stack 1018 may implement the final path or actions from the multiple paths or actions provided by the planning stack 1016. Implementation may involve turning the routes and decisions from the planning stack 1016 into commands for the actuators that control the AV's steering, throttle, brake, and drive unit.

In some aspects, the perception stack 1012, the localization stack 1014, the planning stack 1016, and the control stack 1018 may be part of an AV compute software as discussed herein.

The communication stack 1020 may transmit and receive signals between the various stacks and other components of the AV 1002 and between the AV 1002, the data center 1050, the client computing device 1070, and other remote systems. The communication stack 1020 may enable the local computing device 1010 to exchange information remotely over a network, such as through an antenna array or interface that may provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (L10), Citizens Broadband Radio Service (CBRS), MULTEFIRE, etc.). The communication stack 1020 may also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 1022 may store HD maps and related data of the streets upon which the AV 1002 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer may include geospatial information of traffic signal lights, traffic signs, and other road objects and related attributes.

The AV operational database 1024 may store raw AV data generated by the sensor systems 1004-1008 and other components of the AV 1002 and/or data received by the AV 1002 from remote systems (e.g., the data center 1050, the client computing device 1070, etc.). In some embodiments, the raw AV data may include HD LIDAR point cloud data, image or video data, RADAR data, GPS data, and other sensor data that the data center 1050 may use for creating or updating AV geospatial data.

The data center 1050 may be a private cloud (e.g., an enterprise network, a co-location provider network, etc.), a public cloud (e.g., an Infrastructure as a Service (IaaS) network, a PaaS network, a SaaS network, or other Cloud Service Provider (CSP) network), a hybrid cloud, a multi-cloud, and so forth. The data center 1050 may include one or more computing devices remote to the local computing device 1010 for managing a fleet of AVs and AV-related services. For example, in addition to managing the AV 1002, the data center 1050 may also support a ridesharing service, a delivery service, a remote/roadside assistance service, street services (e.g., street mapping, street patrol, street cleaning, street metering, parking reservation, etc.), and the like.

The data center 1050 may send and receive various signals to and from the AV 1002 and the client computing device 1070. These signals may include sensor data captured by the sensor systems 1004-1008, roadside assistance requests, software updates, ridesharing pick-up and drop-off instructions, and so forth. In this example, the data center 1050 includes one or more of a data management platform 1052, an Artificial Intelligence/Machine Learning (AI/ML) platform 1054, a simulation platform 1056, a PI controller 1057, a remote assistance platform 1058, a ridesharing platform 1060, and a map management platform 1062, among other systems.

Data management platform 1052 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 1050 may access data stored by the data management platform 1052 to provide their respective services.

The AI/ML platform 1054 may provide the infrastructure for training and evaluating machine learning algorithms for operating the AV 1002, the simulation platform 1056, the remote assistance platform 1058, the ridesharing platform 1060, the map management platform 1062, and other platforms and systems. Using the AI/ML platform 1054, data scientists may prepare data sets from the data management platform 1052; select, design, and train machine learning models; evaluate, refine, and deploy the models; maintain, monitor, and retrain the models; and so on.

The simulation platform 1056 may enable testing and validation of the algorithms, machine learning models, neural networks, and other development efforts for the AV 1002, the remote assistance platform 1058, the ridesharing platform 1060, the map management platform 1062, and other platforms and systems. The simulation platform 1056 may replicate a variety of driving environments and/or reproduce real-world scenarios from data captured by the AV 1002, including rendering geospatial information and road infrastructure (e.g., streets, lanes, crosswalks, traffic lights, stop signs, etc.) obtained from the map management platform 1062; modeling the behavior of other vehicles, bicycles, pedestrians, and other dynamic elements; simulating inclement weather conditions, different traffic scenarios; and so on.

The PI controller 1057 may be arranged in a feedback loop and configured to compute a control variable for scaling agents in a cluster as discussed herein. In some embodiments, the PI controller 1057 is a PID controller, as described above.

The remote assistance platform 1058 may generate and transmit instructions regarding the operation of the AV 1002. For example, in response to an output of the AI/ML platform 1054 or other system of the data center 1050, the remote assistance platform 1058 may prepare instructions for one or more stacks or other components of the AV 1002.

The ridesharing platform 1060 may interact with a customer of a ridesharing service via a ridesharing application 1072 executing on the client computing device 1070. The client computing device 1070 may be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 1072. The client computing device 1070 may be a customer's mobile computing device or a computing device integrated with the AV 1002 (e.g., the local computing device 1010). The ridesharing platform 1060 may receive requests to be picked up or dropped off from the ridesharing application 1072 and dispatch the AV 1002 for the trip.

Map management platform 1062 may provide a set of tools for the manipulation and management of geographic and spatial (geospatial) and related attribute data. The data management platform 1052 may receive LIDAR point cloud data, image data (e.g., still image, video, etc.), RADAR data, GPS data, and other sensor data (e.g., raw data) from one or more AVs 1002, Unmanned Aerial Vehicles (UAVs), satellites, third-party mapping services, and other sources of geospatially referenced data. The raw data may be processed, and map management platform 1062 may render base representations (e.g., tiles (2D), bounding volumes (3D), etc.) of the AV geospatial data to enable users to view, query, label, edit, and otherwise interact with the data. Map management platform 1062 may manage workflows and tasks for operating on the AV geospatial data. Map management platform 1062 may control access to the AV geospatial data, including granting or limiting access to the AV geospatial data based on user-based, role-based, group-based, task-based, and other attribute-based access control mechanisms. Map management platform 1062 may provide version control for the AV geospatial data, such as to track specific changes that (human or machine) map editors have made to the data and to revert changes when necessary. Map management platform 1062 may administer release management of the AV geospatial data, including distributing suitable iterations of the data to different users, computing devices, AVs, and other consumers of HD maps. Map management platform 1062 may provide analytics regarding the AV geospatial data and related data, such as to generate insights relating to the throughput and quality of mapping tasks.

In some embodiments, the map viewing services of map management platform 1062 may be modularized and deployed as part of one or more of the platforms and systems of the data center 1050. For example, the AI/ML platform 1054 may incorporate the map viewing services for visualizing the effectiveness of various object detection or object classification models, the simulation platform 1056 may incorporate the map viewing services for recreating and visualizing certain driving scenarios, the remote assistance platform 1058 may incorporate the map viewing services for replaying traffic incidents to facilitate and coordinate aid, the ridesharing platform 1060 may incorporate the map viewing services into the client application 1072 to enable passengers to view the AV 1002 in transit en route to a pick-up or drop-off location, and so on.

Example Processor-Based System

Figure 8:
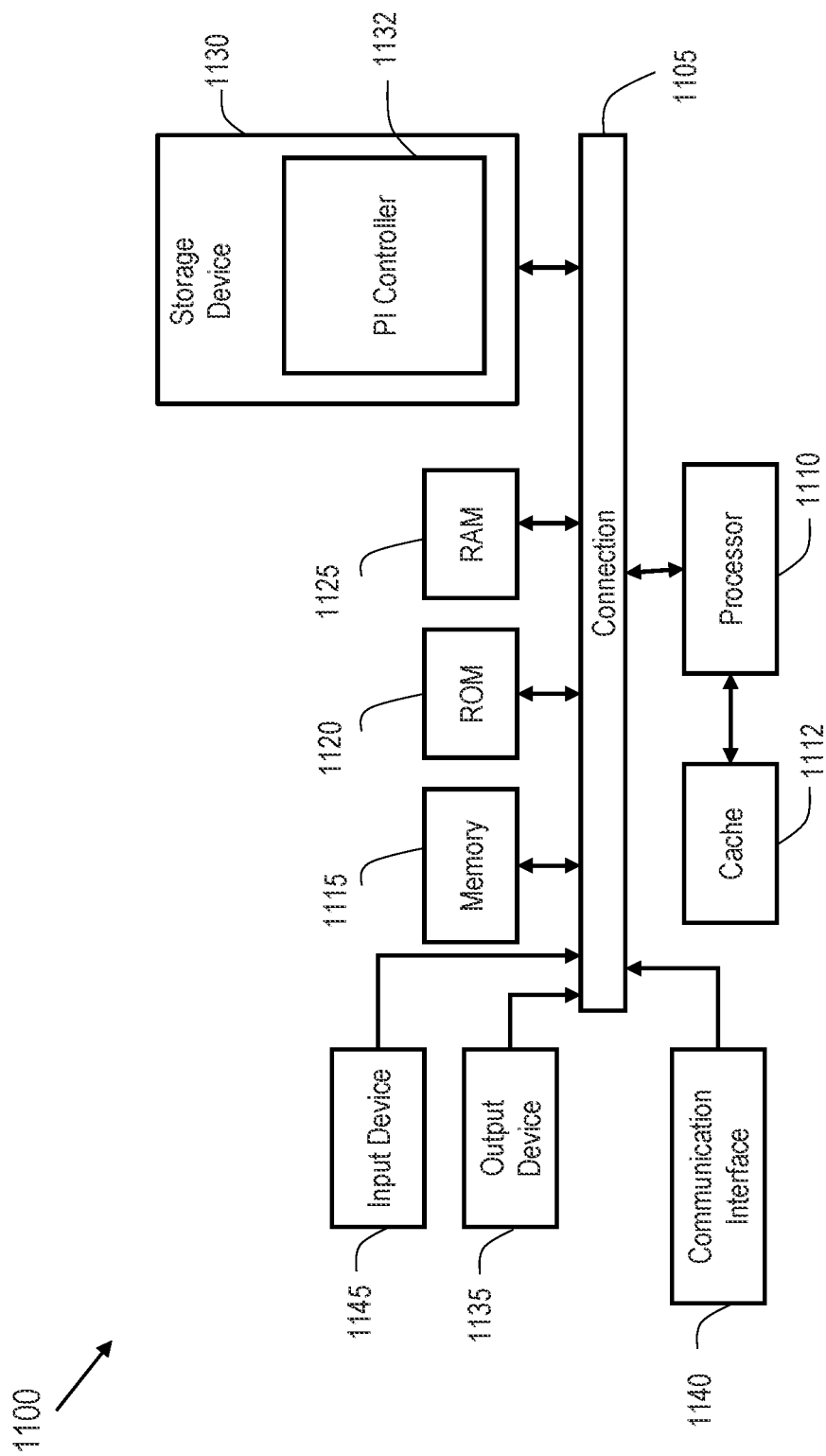
FIG. 8 illustrates an example processor-based system with which some aspects of the subject technology may be implemented.

FIG. 8 illustrates an example processor-based system with which some aspects of the subject technology may be implemented. For example, processor-based system 1100 may be any computing device making up, or any component thereof in which the components of the system are in communication with each other using connection 1105. Connection 1105 may be a physical connection via a bus, or a direct connection into processor 1110, such as in a chipset architecture. Connection 1105 may also be a virtual connection, networked connection, or logical connection.

In some embodiments, computing system 1100 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1100 includes at least one processing unit (CPU or processor) 1110 and connection 1105 that couples various system components including system memory 1115, such as Read-Only Memory (ROM) 1120 and RAM 1125 to processor 1110. Computing system 1100 may include a cache of high-speed memory 1112 connected directly with, in close proximity to, or integrated as part of processor 1110.

Processor 1110 may include any general-purpose processor and a hardware service or software service, such as an PI controller 1132 stored in storage device 1130, configured to control processor 1110 as well as a special-purpose processor where software instructions are incorporated into the actual processor design. The PI controller 1132 may be arranged in a feedback loop and configured to compute a control variable for scaling agents in a cluster as discussed herein. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which may represent any number of input mechanisms, such as a microphone for speech, a touch-sensitive screen for gesture or graphical input, keyboard, mouse, motion input, speech, etc. Computing system 1100 may also include output device 1135, which may be one or more of a number of output mechanisms known to those of skill in the art. In some instances, multimodal systems may enable a user to provide multiple types of input/output to communicate with computing system 1100. Computing system 1100 may include communications interface 1140, which may generally govern and manage the user input and system output. The communication interface may perform or facilitate receipt and/or transmission wired or wireless communications via wired and/or wireless transceivers, including those making use of an audio jack/plug, a microphone jack/plug, a USB port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEQCON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, WLAN signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 may be a non-volatile and/or non-transitory and/or computer-readable memory device and may be a hard disk or other types of computer-readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, RAM, Atatic RAM (SRAM), Dynamic RAM (DRAM), ROM, Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 1130 may include software services, servers, services, etc., that when the code that defines such software is executed by the processor 1110, it causes the system 1100 to perform a function. In some embodiments, a hardware service that performs a particular function may include the software component stored in a computer-readable medium in connection with the necessary hardware components, such as processor 1110, connection 1105, output device 1135, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 provides computer-implemented method, the method including receiving, at a controller in a feedback loop, a target number of idle agents, where an idle agent is a computing resource in a cluster of cloud-based computing resources; receiving, at the controller, a current number of idle agents in the cluster of cloud-based computing resources; computing a control variable for the cluster of cloud-based computing resources based on the target number of idle agents and the current number of idle agents; and submitting the control variable to a scheduler for managing the cluster of cloud-based computing resources, where the number of idle agents in the cluster of cloud-based computing resources scales based on the control variable.

Example 2 provides the computer-implemented method of example 1, where the controller is a proportional-integral controller, and the control variable is a sum of a proportional term that is proportional to an error, where the error is a difference between the target number of idle agents and the current number of idle agents, and an integral term that integrates past values of the error.

Example 3 provides the computer-implemented method of example 2, where the controller is configured to store past values of the error in a moving window, and the integral term is calculated based on the past values in the moving window.

Example 4 provides the computer-implemented method of example 3, where the integral term is calculated from an exponentially weighted moving average of values in the moving window.

Example 5 provides the computer-implemented method of example 2, further including comparing the integral term to a threshold value; and if the integral term exceeds the threshold value, calculating the control variable as a sum of the proportional term and the threshold value.

Example 6 provides the computer-implemented method of example 1, where the controller is a proportional-integral-derivative controller, and the control variable is a sum of a proportional term that is proportional to an error, where the error is a difference between the target number of idle agents and the current number of idle agents; an integral term proportional to a sum of past values of the error; and a derivative term proportional to a change in the error.

Example 7 provides the computer-implemented method of example 1, further including comparing the control variable to a threshold value; and if the control variable exceeds the threshold value, submitting the threshold value to the scheduler.

Example 8 provides the computer-implemented method of example 1, where the cluster is for performing tasks associated with a vehicle software build.

Example 9 provides the computer-implemented method of example 1, where the cluster is for performing continuous integration build tasks.

Example 10 provides a computer-implemented system including one or more processing units; and one or more non-transitory computer-readable media storing instructions, when executed by the one or more processing units, cause the one or more processing units to perform operations including receiving a target number of idle agents, where an idle agent is a computing resource in a cluster of cloud-based computing resources; receiving a current number of idle agents in the cluster of cloud-based computing resources; computing a control variable for the cluster of cloud-based computing resources based on the target number of idle agents and the current number of idle agents; and submitting the control variable to a scheduler for managing the cluster of cloud-based computing resources, where the number of idle agents in the cluster of cloud-based computing resources scales based on the control variable.

Example 11 provides the computer-implemented system of example 10, where the control variable is a sum of a proportional term that is proportional to an error, where the error is a difference between the target number of idle agents and the current number of idle agents, and an integral term that integrates past values of the error.

Example 12 provides the computer-implemented system of example 11, where the operations further include storing past values of the error in a moving window, and the integral term is calculated based on the past values in the moving window.

Example 13 provides the computer-implemented system of example 11, the operations further including comparing the integral term to a threshold value; and if the integral term exceeds the threshold value, calculating the control variable as a sum of the proportional term and the threshold value.

Example 14 provides the computer-implemented system of example 10, where the control variable is a sum of a proportional term that is proportional to an error, where the error is a difference between the target number of idle agents and the current number of idle agents; an integral term proportional to a sum of past values of the error; and a derivative term proportional to a change in the error.

Example 15 provides the computer-implemented system of example 10, the operations further including comparing the control variable to a threshold value; and if the control variable exceeds the threshold value, submitting the threshold value to the scheduler.

Example 16 provides the computer-implemented system of example 10, where the cluster is for performing continuous integration build tasks.

Example 17 provides one or more non-transitory, computer-readable media encoded with instructions that, when executed by one or more processing units, cause the one or more processing units to perform operations including receiving, at a controller in a feedback loop, a target number of idle agents, where an idle agent is a computing resource in a cluster of cloud-based computing resources receiving, at the controller, a current number of idle agents in the cluster of cloud-based computing resources; computing a control variable for the cluster of cloud-based computing resources based on the target number of idle agents and the current number of idle agents; and submitting the control variable to a scheduler for managing the cluster of cloud-based computing resources, where the number of idle agents in the cluster of cloud-based computing resources scales based on the control variable.

Example 18 provides the one or more non-transitory, computer-readable media of example 17, where the control variable is a sum of a proportional term that is proportional to an error, where the error is a difference between the target number of idle agents and the current number of idle agents, and an integral term that integrates past values of the error.

Example 19 provides the one or more non-transitory, computer-readable media of example 18, where the controller is configured to store past values of the error in a moving window, and the integral term is calculated based on the past values in the moving window.

Example 20 provides the one or more non-transitory, computer-readable media of example 17, where the control variable is a sum of a proportional term that is proportional to an error, where the error is a difference between the target number of idle agents and the current number of idle agents; an integral term proportional to a sum of past values of the error; and a derivative term proportional to a change in the error.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

The invention claimed is:

1. A computer-implemented method, the method comprising:
   receiving, at a controller in a feedback loop, a target number of idle agents, wherein an idle agent is a computing resource in a cluster of cloud-based computing resources;
   receiving, at the controller, a current number of idle agents in the cluster of cloud-based computing resources;
   computing a control variable for the cluster of cloud-based computing resources based on the target number of idle agents and the current number of idle agents; and
   submitting the control variable to a scheduler for managing the cluster of cloud-based computing resources, wherein the number of idle agents in the cluster of cloud-based computing resources scales based on the control variable,
   wherein the controller is a proportional-integral-derivative controller, and the control variable is a sum of:
      a proportional term that is proportional to an error, wherein the error is a difference between the target number of idle agents and the current number of idle agents;
      an integral term proportional to a sum of past values of the error; and
      a derivative term proportional to a change in the error.

2. The computer-implemented method of claim 1, wherein the controller is configured to store past values of the error in a moving window, and the integral term is calculated based on the past values in the moving window.

3. The computer-implemented method of claim 2, wherein the integral term is calculated from an exponentially weighted moving average of values in the moving window.

4. The computer-implemented method of claim 1, further comprising:
   comparing the integral term to a threshold value; and
   if the integral term exceeds the threshold value, calculating the control variable as a sum of the proportional term and the threshold value.

5. The computer-implemented method of claim 1, further comprising:
   comparing the control variable to a threshold value; and
   if the control variable exceeds the threshold value, submitting the threshold value to the scheduler.

6. The computer-implemented method of claim 1, wherein the cluster is for performing tasks associated with a vehicle software build.

7. The computer-implemented method of claim 1, wherein the cluster is for performing continuous integration build tasks.

8. A computer-implemented system, comprising:
   one or more processing units; and
   one or more non-transitory computer-readable media storing instructions, when executed by the one or more processing units, cause the one or more processing units to perform operations comprising:
      receiving a target number of idle agents, wherein an idle agent is a computing resource in a cluster of cloud-based computing resources;
      receiving a current number of idle agents in the cluster of cloud-based computing resources;
      computing a control variable for the cluster of cloud-based computing resources based on the target number of idle agents and the current number of idle agents; and
      submitting the control variable to a scheduler for managing the cluster of cloud-based computing resources, wherein the number of idle agents in the cluster of cloud-based computing resources scales based on the control variable,
   wherein the control variable is a sum of:
      a proportional term that is proportional to an error, wherein the error is a difference between the target number of idle agents and the current number of idle agents;
      an integral term proportional to a sum of past values of the error; and
      a derivative term proportional to a change in the error.

9. The computer-implemented system of claim 8, wherein the operations further comprise storing past values of the error in a moving window, and the integral term is calculated based on the past values in the moving window.

10. The computer-implemented system of claim 8, the operations further comprising:
    comparing the integral term to a threshold value; and
    if the integral term exceeds the threshold value, calculating the control variable as a sum of the proportional term and the threshold value.

11. The computer-implemented system of claim 10, the operations further comprising:
    comparing the control variable to a threshold value; and
    if the control variable exceeds the threshold value, submitting the threshold value to the scheduler.

12. The computer-implemented system of claim 8, wherein the cluster is for performing continuous integration build tasks.

13. One or more non-transitory, computer-readable media encoded with instructions that, when executed by one or more processing units, cause the one or more processing units to perform operations comprising:

receiving, at a controller in a feedback loop, a target number of idle agents, wherein an idle agent is a computing resource in a cluster of cloud-based computing resources;

receiving, at the controller, a current number of idle agents in the cluster of cloud-based computing resources;

computing a control variable for the cluster of cloud-based computing resources based on the target number of idle agents and the current number of idle agents; and submitting the control variable to a scheduler for managing the cluster of cloud-based computing resources, wherein the number of idle agents in the cluster of cloud-based computing resources scales based on the control variable, wherein the control variable is a sum of:
   a proportional term that is proportional to an error, wherein the error is a difference between the target number of idle agents and the current number of idle agents;
   an integral term proportional to a sum of past values of the error; and
   a derivative term proportional to a change in the error.

14. The one or more non-transitory, computer-readable media of claim 13, wherein the controller is configured to store past values of the error in a moving window, and the integral term is calculated based on the past values in the moving window.

* * * * *